June 24, 1930. J. W. HOFMANN 1,766,995
OSCILLATION DAMPING DEVICE FREE FROM RADIATION FOR ELECTRIC LINES
Filed Aug. 17, 1927
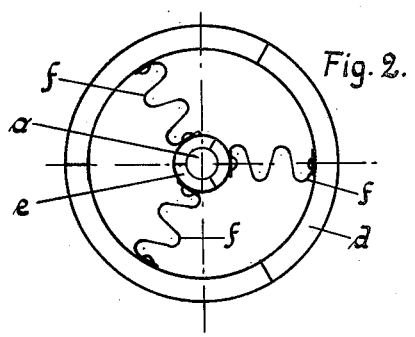
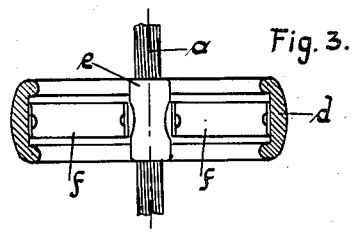
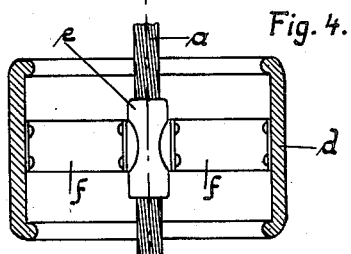
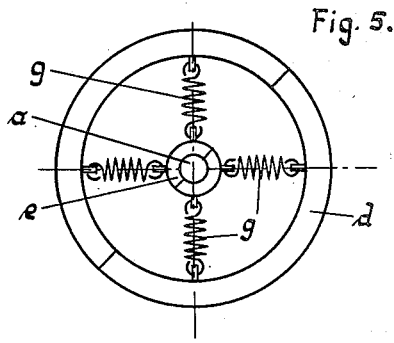
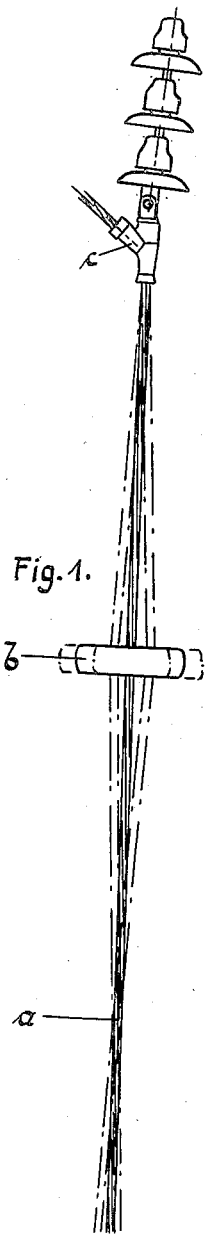
Inventor:-
Johannes Wilhelm Hofmann
by Brown Seward
Attorneys Patented June 24, 1930

1,766,995

UNITED STATES PATENT OFFICE

JOHANNES WILHELM HOFMANN, OF KOTZSCHENBRODA, NEAR DRESDEN, GERMANY

OSCILLATION DAMPING DEVICE FREE FROM RADIATION FOR ELECTRIC LINES

Application filed August 17, 1927, Serial No. 213,564, and in Germany February 11, 1927.

It is a known phenomenon that aerial lines suspended or fastened to insulator-chains begin to oscillate. The causes of said oscillations can be of various kinds; they may come from the movement of the post, its cross-arms or the insulator-chains, but they can also be caused by currents of air, changes of temperature or similar atmospheric events. Now, said oscillations have a very detrimental effect showing itself in that the line-cable prematurely breaks down at its points of fixation to stay or supporting clamps or terminals. The causes of said premature destruction can be found in that the oscillations of the line-cable are brought to rest at the stay or supporting-points without any change and the bending loads maintained thereby in the line-cable cause a fatigue of the material; and the ruptures will take place after a relatively short time, if the oscillations are reinforced by the phenomena of resonance. However, means have heretofore been found and used for damping the oscillations or preventing the phenomena of resonance. A known means of this kind consists in weights which are suspended on the line near the fixation or supporting points, said weights being yieldingly connected by springs with the line. If, then, oscillations take place in the line the weights are also moved. However, the frequency of oscillation of the weights is different from the frequency of oscillation of the line as a consequence of the yielding connection with the line, whereby the waves of oscillation are damped within the line. The oscillations of the yieldingly arranged weights act in opposition to the oscillations of the line-cable. It can be determined by experiment what must be the size of the weight to be suspended and the intensity of the spring or yielding connection of the weight with the line-cable for causing the greatest possible damping of the oscillation of the line.

However, the devices ard means of the kind mentioned before and known up to the present have the essential drawback that they are not free from emission and are the cause of troubles as a consequence of intense coronal phenomena. Therefore said devices or means can only be used for earth cables or line cables having a relatively low electrical voltage. In order to make possible the use of such devices for lines of higher voltage, the oscillation damper must be so arranged that emissions and discharge phenomena do not occur.

For this purpose the weight acting as an oscillation-damper is, according to the present invention, arranged as an annular body free from emission and the springs connecting said body with the lines are arranged within the annular body.

The present invention is represented in the drawing by various forms of construction.

Fig. 1 shows the general use of an oscillation-damper situated near to a suspension point. The oscillations appearing in the line $a$ also cause a swinging movement of the damper $b$. The waves of oscillation of the line-cable can thereby transmit themselves freely to the oscillation-damper which acts similarly to a spring suspension of the line-cable and puts at rest the largest waves as a consequence of its opposing natural vibration. Thus only a few harmless oscillations can reach the suspension point $c$.

An oscillation-damper free from emission and of the kind characterized above is represented by several forms in Figs. 2 to 5. Distinguishing this device from those known up to the present it will be seen that the springs forming part of said oscillation-damper and connecting the weight with the line-cable are so arranged that they are situated within a hoop-shaped rim, the edges of which are rounded in such a manner that emissions or phenomena of corona cannot appear. Said rim has the effect of an emission or radiation-umbrella and is, at the same time, formed or shaped as a weight proper.

The rim can be arranged in various shapes. It can be formed as a ring according to Fig. 3, or as a longitudinal cylinder, shown in Fig. 4. The main point is that the rim completely surrounds the springs and prevents the radiation.

$d$, Figs. 2 to 5, is the weight to be suspended, shaped as a hoop, Fig. 3, or as a cylinder, Fig. 4. *a* is the line-cable surrounded by a saddle or sleeve *e*. The springs are fastened to said sleeve and can be arranged as plate springs *f*, Figs. 2, 3 and 4, or as helical springs, Fig. 5. According to the constructions shown, the connection between the weight *d* and the line-cable *a* is not a rigid one, but the weight *d* can move itself in oscillations. The strength and the tension of the springs and the size of the weight to be suspended must be determined by experiments according to the conditions of the line.

What I claim is:

1. An oscillation damper for electric lines comprising, an annular body and springs situated therein for resiliently connecting the body with the line, said body being so rounded as to be free from emissions.

2. An oscillation damper for electric lines comprising, an annular body, springs situated therein for resiliently connecting the body with the line, and a saddle or sleeve on the line, said body being so rounded as to be free from emissions.

In testimony, that I claim the foregoing as my invention, I have signed my name this 4th day of August, 1927.

JOHANNES WILHELM HOFMANN.

CERTIFICATE OF CORRECTION.

Patent No. 1,766,995.    Granted June 24, 1930, to

JOHANNES WILHELM HOFMANN.

It is hereby certified that error appears in the printed specification of the above numbered patent requiring correction as follows: Page 2, after line 26, insert the following as claim 3:

3. The combination with a conductor of a saddle or sleeve fixed to said conductor, a rider having an opening therethrough for receiving said sleeve, said sleeve being movable in said opening and yielding means for resisting movement of said sleeve in said opening.;

and that the said Letters Patent should be read with this correction therein that the same may conform to the record of the case in the Patent Office.

Signed and sealed this 5th day of August, A. D. 1930.

(Seal)

Wm. A. Kinnan,
Acting Commissioner of Patents.